United States Patent
Yu et al.

(10) Patent No.: US 8,138,685 B2
(45) Date of Patent: Mar. 20, 2012

(54) POWER CONVERTING CIRCUIT AND CONTROLLER THEREOF

(75) Inventors: Chung-Che Yu, Taipei County (TW); Shian-Sung Shiu, Taipei County (TW); Hai-Po Li, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 428 days.

(21) Appl. No.: 12/539,624

(22) Filed: Aug. 12, 2009

(65) Prior Publication Data

US 2010/0315017 A1   Dec. 16, 2010

(30) Foreign Application Priority Data

Jun. 10, 2009   (TW) ................... 98119296 A (51) Int. Cl.
*G05F 1/00* (2006.01)
*H05B 37/02* (2006.01)
*H05B 39/04* (2006.01)
*H05B 41/36* (2006.01)

(52) U.S. Cl. ............ 315/291; 315/209 R; 315/246; 315/307; 315/DIG. 5

(58) Field of Classification Search .............. None
See application file for complete search history.

(56) References Cited

U.S. PATENT DOCUMENTS

| 6,008,590 A * | 12/1999 | Giannopoulos et al. ... 315/209 R |
| 7,378,804 B2 * | 5/2008 | Mitsuyasu et al. ............ 315/247 |
| 7,508,142 B2 * | 3/2009 | Green ............................. 315/224 |

* cited by examiner

*Primary Examiner* — Anh Tran
(74) *Attorney, Agent, or Firm* — Jianq Chyun IP Office (57) ABSTRACT

A controller which receives electric power required for operating through a driving voltage terminal and controls a converting circuit to convert an input voltage into an output voltage is provided. The controller is latched to stop providing a part or all of functions until the input voltage is removed. Therefore, the issues of the converting circuit in related arts in shortened life-span and safety of users due to can be avoided in the present invention.

25 Claims, 5 Drawing Sheets

POWER CONVERTING CIRCUIT AND CONTROLLER THEREOF

CROSS-REFERENCE TO RELATED APPLICATION

This application claims the priority benefit of Taiwan application serial no. 98119296, filed Jun. 10, 2009. The entirety of the above-mentioned patent application is hereby incorporated by reference herein and made a part of specification.

BACKGROUND OF THE INVENTION

1. Field of the Invention

The present invention generally relates to a power converting circuit and a controller thereof, and more particularly, to a power converting circuit having latching and protecting functions and the controller thereof.

2. Description of Related Art

Current power supplies are mainly classified into linear power supplies (LPS) and switching power supplies (SPS). The LPS has a simple circuit, small ripples, and less electromagnetic interference (EMI). However, electric devices in the circuit are large, so that volume of the circuit is large, weight thereof is heavy, and further, conversion efficiency thereof is low. On the contrary, the SPS has a more complex circuit, larger ripples, and more EMI, but the SPS is still the mainstream in the market of power supply since it has higher conversion efficiency and less power consumption while idling.

Figure 1:
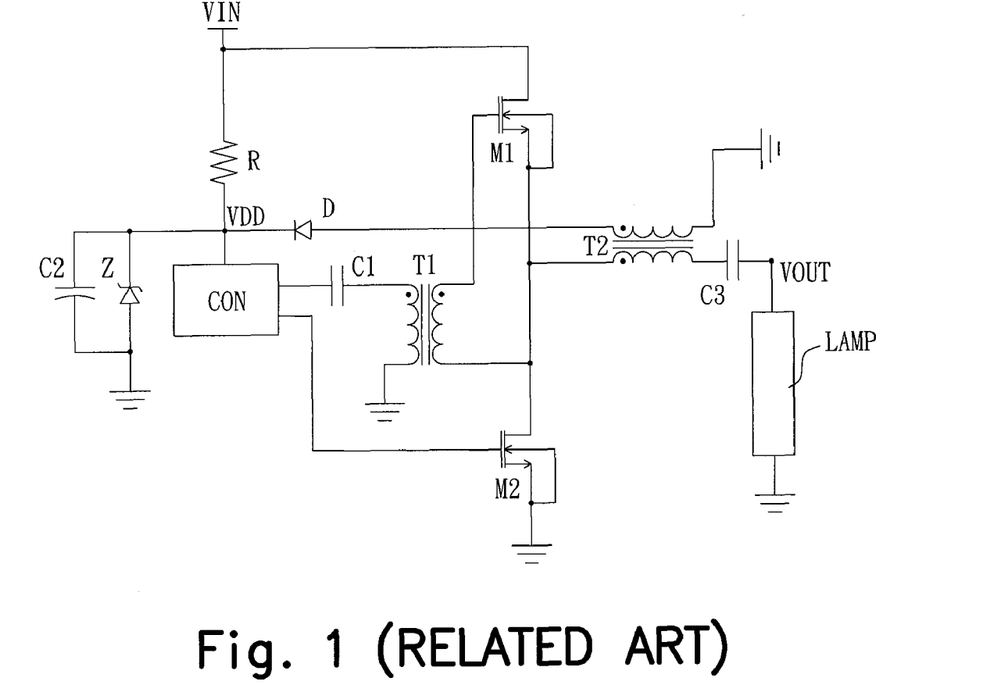
FIG. 1 is a schematic circuit of a SPS configured to drive a lamp in a related art.

FIG. 1 is a schematic circuit of a SPS configured to drive a lamp in a related art. Referring to FIG. 1, The SPS includes an initial resistor R, an initial capacitor C2, a Zener diode Z, a controller CON, a high-side driving capacitor C1, a high-side driving transformer T1, a high-side transistor switch M1, a low-side transistor switch M2, a diode D, an output capacitor C3, and a transformer T2. The SPS is configured to convert a DC input voltage VIN to an AC output voltage VOUT to drive a lamp LAMP.

When the DC input voltage is inputted, a current is supplied to the initial capacitor C2 through the initial resistor R, so that a voltage drop across the initial capacitor C2 is raised until it is equal to the breakdown voltage of the Zener Diode Z. The initial capacitor C2 generates a driving voltage VDD to supply electric power required for operating to the controller CON. When the driving voltage VDD is higher than a start voltage of the controller CON, the controller CON starts, so as to generate control signals to control the high-side transistor switch M1 and the low-side transistor switch M2. Wherein, the controller CON raises a voltage level of the control signal up to a suitable voltage level to control the high-side transistor switch M1 through the high-side driving capacitor C1 and the high-side driving transformer T1. By switching the high-side transistor switch M1 and the low-side transistor switch M2, the electric power of the DC input voltage VIN is transmitted to an output terminal to generate the AC output voltage VOUT to drive the lamp LAMP. The transformer T2 is coupled to the AC output voltage VOUT, and transmits electric power, rectified by the diode D, to the initial capacitor C2.

The initial capacitor C2 gradually stores the electric power because the electric power transmitted through the initial resistor R is more than the electric power consumed by the controller CON before the controller CON starts. After the controller CON started, the electric power through the transformer T2 and the diode D is also supplied to the controller CON. Accordingly, the initial resistor R having a relatively large resistance is used to lower power consumption by the initial resistor R. However, when an abnormal event occurs in the circuit, the DC input voltage VIN can not supply the electric power to the AC output voltage VOUT, so that the transformer T2 and the diode D can not supply the electric power. Moreover, the electric power transmitted through the initial resistor R is not enough to hold all of the electric power required by the controller CON while normally operating, so that the operation of the controller CON may fail.

Figure 3A:
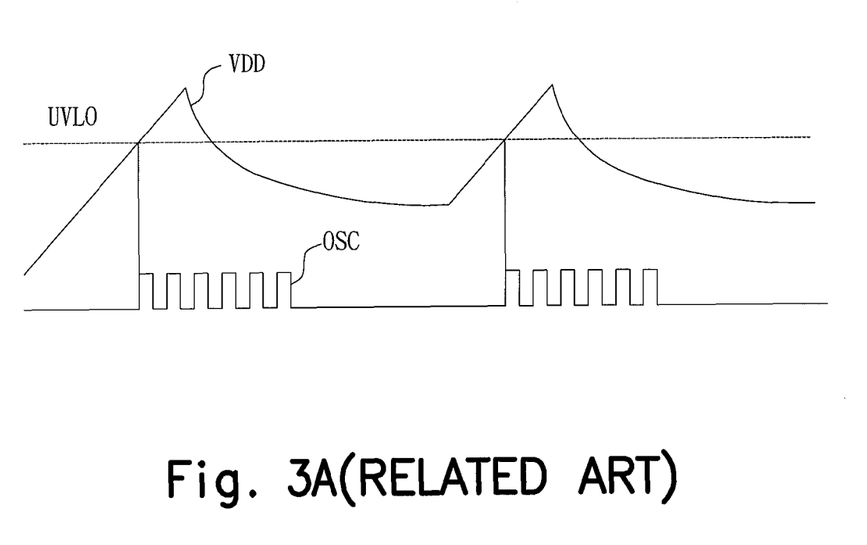
FIG. 3A illustrates a schematic signal waveform of the SPS configured to drive the lamp in the related art while the circuit stays in the abnormal event.

FIG. 3A illustrates a schematic signal waveform of the SPS configured to drive the lamp in the related art while the circuit stays in the abnormal state. Referring to FIG. 3A, When the driving voltage VDD is higher than the start voltage UVLO, the SPS starts to operate. Since an oscillator and a control circuit inside the controller CON start to operate, the current consumed thereby is much more than the current supplied by the DC input voltage VIN through the resistor R. Accordingly, the driving voltage may start to fall down. When the circuit operates at a normal state, the controller CON outputs signals to switch the high-side transistor switch M1 and the low-side transistor switch M2, so that the AC output voltage VOUT is raised, and the electric power is supplied to the driving voltage VDD through the transformer T2 and the diode D. However, when the abnormal event occurs in the circuit, the controller CON stops switching the high-side transistor switch M1 and the low-side transistor switch M2, so that the AC output voltage VOUT is lowered and can not supply the electric power to the driving voltage VDD. As a result, the driving voltage VDD may start to fall down. When the driving voltage VDD has become lower than a voltage range which the controller CON can tolerate, the controller CON stops operating and further consuming power. Accordingly, the driving voltage VDD is raised again until it is higher than the start voltage UVLO, so that the controller CON re-starts. The above-described cycle is repeated until the abnormal event is eliminated. Furthermore, in order to avoid the temporary abnormal event resulting in lamp not lighting, the controller CON may try to turn on the lamp continuously when lamp is not lighting in the related art. In the process, not only life-span of the lamp is shortened due to limitation of start cycles thereof, but also users may get an electric shock while lamp replacing since the users forget to turn off the power source. Accordingly, since the lamp driving circuit may re-start the lamp in the SPS of the related art, not only the life-span of the lamp is shortened, but also using it may be dangerous to the users.

SUMMARY OF THE INVENTION

Accordingly, in an embodiment of the present invention, a controller is latched while an abnormal event occurs in a power converting circuit, so that the controller thereof stops providing a part or all of its functions until an input voltage is removed. As a result, the issues, such as shortened life-span and safety of users, due to the converting circuit in the related arts are avoided in an embodiment of the present invention.

One embodiment of the present invention provides a controller that is adapted to receive electric power required for operating through a driving voltage terminal and configured to control a converting circuit to convert an input voltage into an output voltage. The controller includes a start unit, a control unit, and a latch unit. The start unit is coupled to the driving voltage terminal and generates a starting signal after a driving voltage of the driving voltage terminal is higher than a first predetermined voltage. The control unit is started to control the converting circuit after receiving the starting signal. The latch unit is coupled to the driving voltage terminal and started after receiving the starting signal. Once the controller enters a protection mode, the latch unit generates a latch signal. After receiving the latch signal, the control unit terminates at least a portion of operation thereof to reduce the electric power required for operating, so that the driving voltage is maintained to be higher than a second predetermined voltage, wherein the second predetermined voltage is a lowest operating voltage of the latch unit, and the second predetermined voltage is lower than the first predetermined voltage.

One embodiment of the present invention provides a power converting circuit including a converting circuit, a start circuit, and a controller. The converting circuit is configured to convert an input voltage to an output voltage to drive a load according to at least one control signal. The start circuit is coupled to the DC input voltage to generate a driving voltage. The controller is coupled to the start circuit and the output voltage to receive electric power required for operating and determines whether to operate in a protection mode according to the driving voltage. When the controller does not operate in the protection mode, the controller generates the at least one control signal. On the contrary, when the controller operates in the protection mode, the controller stops outputting the at least one control signal and still operates in the protection mode.

One embodiment of the present invention provides a DC/AC power converting circuit including a converting circuit, a start circuit, a voltage converting device, and a controller. The converting circuit is configured to convert a direct current (DC) input voltage to an alternating current (AC) output voltage to drive a load according to at least one control signal. The start circuit is coupled to the DC input voltage to generate a driving voltage. The voltage converting device is coupled to the AC output voltage and configured to rectify the AC output voltage to supply a rectified voltage. The controller is coupled to the start circuit and the voltage converting device to receive electric power required for operating and determines whether to operate in a protection mode according to the driving voltage. When the controller does not operate in the protection mode, the controller generates the at least one control signal. On the contrary, when the controller operates in the protection mode, the controller stops outputting the at least one control signal and still operates in the protection mode.

It is to be understood that both the foregoing general description and the following detailed description are exemplary, and are intended to provide further explanation of the invention as claimed. In order to make the features and the advantages of the present invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
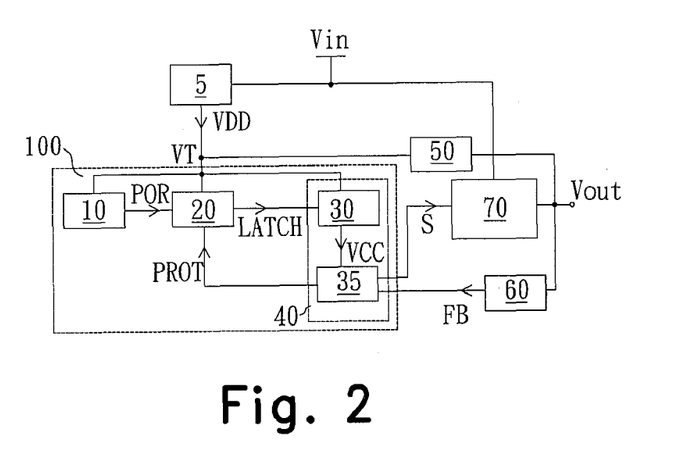
FIG. 2 is a circuit block diagram of a power converting circuit according to an embodiment consistent with the present invention.

FIG. 2 is a circuit block diagram of a power converting circuit according to an embodiment consistent with the present invention. Referring to FIG. 2, the power converting circuit includes a start circuit 5, a converting circuit 70, and a controller 100. The start circuit 5 is coupled to an input voltage Vin to generate a driving voltage VDD to the controller 100, so as to supply voltage and electric power required by the controller 100 while it is starting. The controller 100 is coupled to the start circuit 5 and the output voltage Vout to receive electric power required for operating and outputs at least one control signal S. The converting circuit 70 converts the input voltage Vin to the output voltage Vout configured to drive a load (not shown) according to the at least one control signal S. The controller 100 is coupled to the start circuit 5 and the output voltage Vout to receive the electric power required for operating. If the output voltage Vout is not applicable as a driving voltage source of the output voltage Vout is stepped down and/or rectified to be converted to a suitable voltage required by the controller 100 for operating through a voltage converting device 50. Moreover, the power converting circuit further includes a feedback circuit 60 coupled to the output voltage Vout to generate at least one feedback signal FB. The controller 100 generates the at least one control signal S according to the at least one feedback signal FB to control the converting circuit 70.

The controller 100 receives the electric power required for operating through a driving voltage terminal VT, and the converting circuit 70 converts the input voltage Vin to the output voltage Vout. In the present embodiment, the driving voltage terminal VT is coupled to the input voltage Vin and the output voltage Vout to receive the electric power. In practice, the driving voltage terminal VT may be coupled to another power supply. The controller 100 includes a start unit 10, a latch unit 20, and a control unit 40. The start unit 10 is coupled to the driving voltage terminal VT and determines whether the driving voltage VDD of the driving voltage terminal VT is enough to start the controller 100 or not. That is, the start unit 10 determines whether the driving voltage VDD is higher than a first determined voltage or not. If so, the start unit 10 generates a starting signal POR to the latch unit 20. The latch unit 20 is coupled to the driving voltage terminal VT and is started after receiving the starting signal POR. When the controller 100 operates at a normal state, the latch unit 20 does not work. However, when any abnormal event occurs in the power converting circuit, and the controller 100 enters a protection mode, the latch unit 20 generates a latch signal LATCH to the control unit 40, so that the control unit 40 stops a part or all of functions to reduce the electric power required for operating In the present embodiment, the control unit 40 further includes a voltage stabilizer 30 and a function device 35. The voltage stabilizer 30 is coupled to the driving voltage VDD to generate an operating voltage VCC to supply the electric power required by the control unit 40 for operating, and the function device 35 generates the control signal S according to the feedback signal FB. After receiving the latch signal LATCH, the voltage stabilizer 30 stops supplying the operating voltage VCC, so that the function device 35 stops operating.

In the present embodiment, the electric power required by the controller 100 is supplied by both the input voltage Vin and the output voltage Vout. Before the controller 100 starts, e.g. the input voltage Vin is not inputted yet, or the controller 100 does not receive a starting signal yet, the controller 100 simply requires little electric power to maintain the start unit 10 to operate. When the input voltage Vin is high enough to start the start unit 10 to operate, it means that the starting signal POR is outputted to the latch unit 20. In practice, the starting signal POR may also be used to reset the control unit 40 to be a initial state, so that the circuit inside the control unit 40 starts to operate from an initial state. Generally, the electric power supplied by the input voltage Vin through the start circuit 5 simply supplies the electric power enough to the start unit 10 before the controller 100 does not start yet. As a result, power consumption due to the start circuit 5 can be reduced, especially when the input voltage Vin is much higher than the driving voltage VDD. After the controller 100 started, the output voltage Vout is raised and supplied to the driving voltage terminal VT through the voltage converting device 50 for extra required electric power due the controller 100 starting.

Figure 3B:
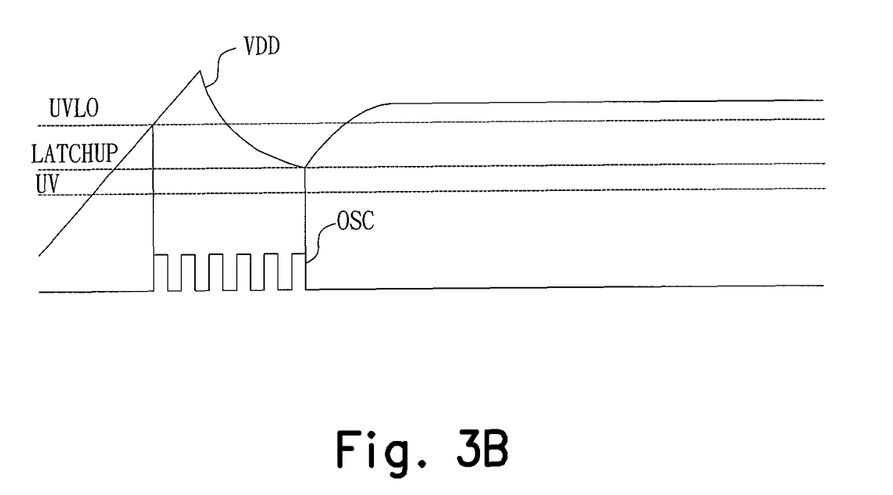
FIG. 3B illustrates a schematic signal waveform of the power converting circuit according to an embodiment consistent with the present invention.

When the controller 100 is in starting process or operates at the normal state, and the abnormal event occurs in the circuit, the controller 100 stops outputting the control signal S. As a result, the output voltage Vout can not supply the electric power enough to the driving voltage terminal VT, so that the driving voltage VDD starts to fall down. The above-described abnormal event, for example, is that the output voltage Vout is greater than a predetermined over voltage value (Over Voltage Protection), that the output voltage Vout is less than a predetermined under voltage value (Under Voltage Protection), that the driving voltage VDD is less than a predetermined under voltage value (Under Voltage Lock-Out), that the driving voltage is greater than the predetermined driving over voltage value (Over Voltage Protection), that a current of the load is greater than a predetermined over current value (Over Current Protection), that the current of the load is less than a predetermined under current value (Under Current Protection), or that a system temperature is greater than a predetermined (Over Temperature Protection). FIG. 3B illustrates a schematic signal waveform of the power converting circuit according to an embodiment consistent with the present invention. Referring to FIG. 3B, when the driving voltage VDD is higher than a first predetermined voltage UVLO, the function device 35 generates a clock signal OSC and starts to operate. However, since the output voltage Vout can not immediately supply the extra electric power required by the controller 100 after started, the driving voltage VDD starts to fall down. When the driving voltage VDD falls down to a third predetermined voltage LATCHUP, the latch unit 20 outputs the latch signal LATCH, so that the control unit 40 stops a part or all of its functions, and the function device 35 stops generating the clock signal OSC, as shown in FIG. 3B. Meanwhile, the electric power required by the controller 100 for operating is lower than or equal to the electric power supplied by the input voltage Vin through the start circuit 5, so that the driving voltage VDD stops falling down or is raised. The third predetermined voltage LATCHUP is lower than the first predetermined voltage UVLO but higher than or equal to the second predetermined voltage UV, wherein the second predetermined voltage UV is a lowest operating voltage of the latch unit 20. Accordingly, even if the controller 100 enters the protection mode and so the output voltage Vout can not supply the electric power to the controller 100 again, the driving voltage VDD is still maintained to be higher than the second predetermined voltage UV in the present embodiment consistent with the present invention. As a result, the latch unit 20 still latches the controller 100, so that the issue of continuously re-starting the lamp due to reset or circuit design in the related art is avoided.

Moreover, the driving voltage terminal VT of the controller 100 may be coupled to another power supply for operating instead of the output voltage Vout or the input voltage Vin. If the power supply is unstable, the controller 100 may also re-start continuously. In the present invention, once detecting that the driving voltage VDD is lower than the third predetermined voltage LATCHUP, the controller 100 enters the protection mode and is latched immediately, so that the issue of continuously re-starting the circuit is avoided. Furthermore, the controller 100 may receive the required electric power by coupling two or more than two terminals to different power supplies. For example, one of the two terminals is coupled to the input voltage Vin to supply the electric power to the start unit 10 and the latch unit 20, and the other of the two terminals is coupled to the output voltage Vout to supply the electric power to the control unit 40. If the output voltage Vout starts to fall down due to the abnormal event in the circuit, the control unit 40 can detect that the output voltage Vout is less than the predetermined under voltage value and so output a protecting signal PROT to the latch unit 20 before the control unit 40 can not operate due to too low output voltage Vout. As a result, the latch unit 20 generates the latch signal LATCH, so that the controller 100 is latched.

Moreover, the controller in the present embodiment may be applied to all kinds of power converting circuits, such as a DC/DC power converting circuit, an AC/DC power converting circuit, or a DC/AC power converting circuit. A plurality of exemplary embodiments consistent with the present invention is described in following.

Figure 4:
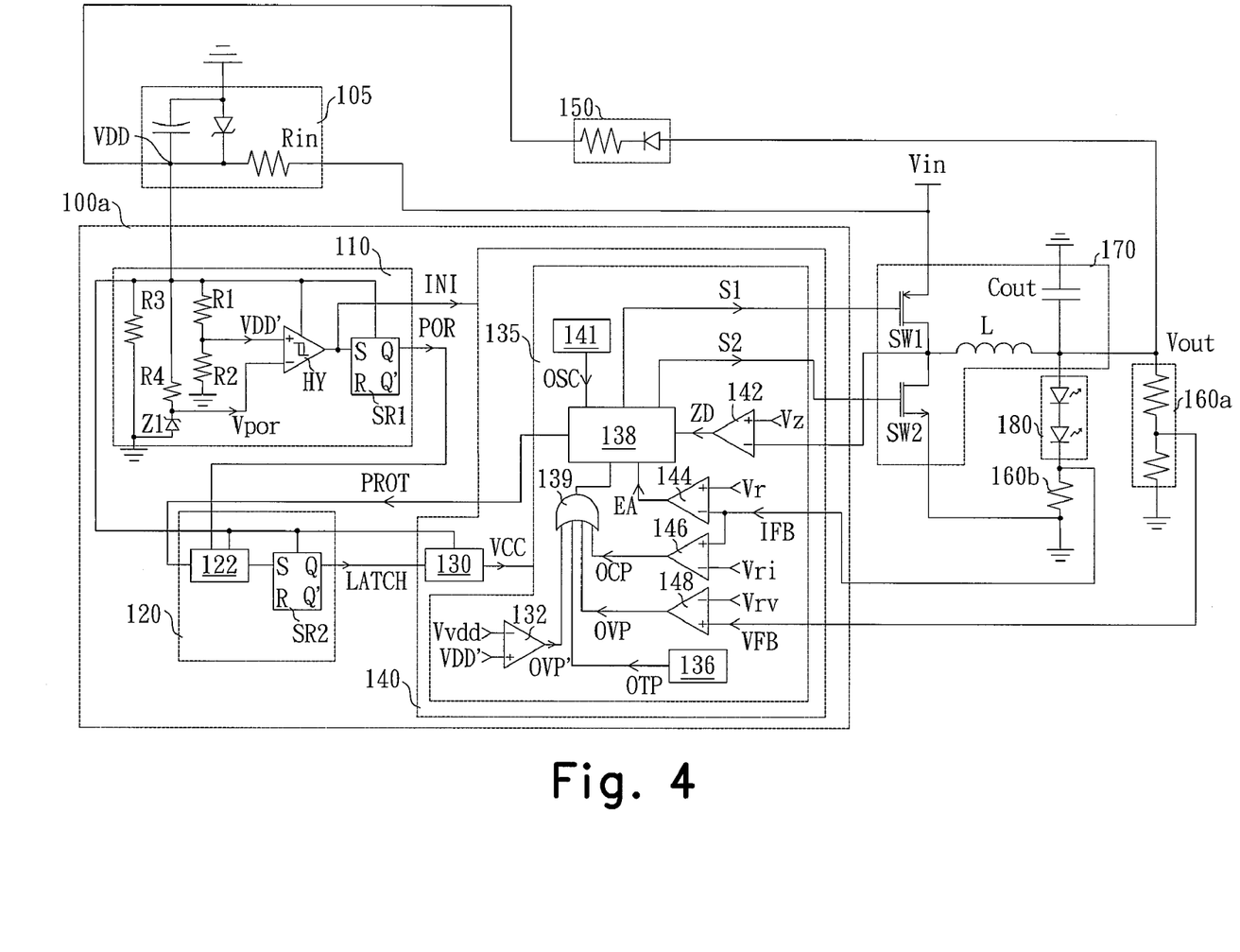
FIG. 4 is a schematic circuit of a power converting circuit according to a first embodiment consistent with the present invention.

FIG. 4 is a schematic circuit of a power converting circuit according to a first embodiment consistent with the present invention. Referring to FIG. 4, the power converting circuit includes a controller 100a, a start circuit 105, a feedback circuit, a converting circuit 170, wherein the feedback circuit includes a first feedback unit 160a and a second feedback unit 160b. The power converting circuit converts an input voltage Vin to an output voltage Vout to drive a light-emitting diode (LED) module 180. The start circuit 105 includes a starting resistor Rin, a capacitor and a Zener diode, wherein the capacitor and the Zener diode are coupled in parallel. One terminal of the start circuit 105 is grounded, and another one of the start circuit 105 is coupled to the input voltage Vin through the starting resistor Rin. Power consumption of the start circuit 105 is adjusted by adjusting the resistance of the starting resistor Rin. Generally, for enhancing efficiency of the power converting circuit, the resistance of the starting resistor Rin is set to be relatively high to reduce the power consumption of the start circuit 105. After the input voltage Vin is inputted to the power converting circuit, the capacitor inside the start circuit 105 starts to store electric power and generates a driving voltage VDD to the controller 100a, so as to supply the voltage and the electric power required by the controller 100a while it is starting. The voltage converting device 150 comprises a rectifying diode and a resistor and is coupled to the output voltage Vout, the controller 100a, and the start circuit 105. When the driving voltage VDD is higher than the output voltage Vout, the voltage converting device 150 avoids the electric power from the input voltage Vin to be inputted to the converting circuit 170. The first feedback unit 160a in the feedback circuit is coupled to the output voltage Vout to generate a voltage feedback signal VFB representing the amount of the output voltage Vout, and the second feedback unit 160b is coupled to the LED module 180 to generate a current feedback signal IFB representing the amount of the current flowing through the LED module 180. The converting circuit 170 includes a first switch SW1, a second switch SW2, an inductor L, and an output capacitor Cout. The first switch SW1 and the second switch SW2 are switched respectively according to a first control signal S1 and a second control signal S2, so that the electric power from the input voltage Vin is converted to the output voltage Vout through the inductor L and the output capacitor Cout.

The controller 100a includes a start unit 110, a latch unit 120, and a control unit 140. The start unit 110 is coupled to the driving voltage VDD to determine whether the driving voltage VDD is greater than a predetermined voltage value. If so, the start unit 110 generates a starting signal POR. The start unit 110 includes a first resistor R1, a second resistor R2, a third resistor R3, a fourth resistor R4, a Zener diode Z1, a hysteresis comparator HY, and a first SR latch SR1. The start unit 110 is coupled to the output voltage Vout to receive the electric power required by the circuit for operating. The fourth resistor R4 and the Zener diode Z1 coupled in series and the third resistor R3 are coupled in parallel between the driving voltage VDD and the ground. A connection point of the fourth resistor R4 and the Zener diode Z1 outputs a reference voltage value Vpor to the hysteresis comparator HY. Before the driving voltage VDD is not raised to be higher than the breakdown voltage of the Zener diode Z1 yet, the reference voltage value Vpor is raised along with the driving voltage VDD. After the driving voltage VDD is raised to be higher than the breakdown voltage of the Zener diode Z1, the reference voltage value Vpor is maintained at the breakdown voltage of the Zener diode Z1. The first resistor R1 and the second resistor R2 is coupled in series between the driving voltage VDD and the ground to generate a voltage division signal VDD' to the hysteresis comparator HY. When the driving voltage VDD is raised to the predetermined voltage value, the voltage level of the voltage division signal VDD' is higher than the voltage level of the reference voltage value Vpor, so that the hysteresis comparator HY outputs an initial signal INI with high voltage level to the first SR latch SR1 and the control unit 140. The input terminal S of the first SR latch SR1 receives the initial signal INI with high voltage level, and the output terminal Q thereof generates a starting signal POR with high voltage level to the latch unit 120.

The latch unit 120 includes a one shot circuit 122 and a second SR latch SR2 and is coupled to the driving voltage VDD to receive the electric power required by the circuit for operating. The one shot circuit 122 is started after receiving the starting signal POR. When the protecting signal PORT is at a low voltage level, it means that the circuit operates normally, and the second SR latch SR2 outputs a latch signal LATCH with low voltage level, a default state. Once the protecting signal PROT is at the high voltage level, the one shot circuit 122 outputs a pulse signal with high voltage level to the input terminal S of the second SR latch SR2, so that the latch signal LATCH is changed to be high voltage level.

The control unit 140 includes a voltage stabilizer 130 and the function device 135 and is started after receiving the initial signal INI. The voltage stabilizer 130 is started after receiving the initial signal INI and according to the latch signal LATCH determines whether to convert the driving voltage VDD to the operating voltage VCC or not to supply the electric power required by the function device 135 for operating. When the latch signal LATCH is at the low voltage level, the voltage stabilizer 130 outputs the operating voltage VCC. On the contrary, when the latch signal LATCH is at the high voltage level, the voltage stabilizer 130 stops outputting the operating voltage VCC, so that the function device 135 stops operating.

The function device 135 includes a driving over voltage protection device 132, an over temperature protection 136, a processing device 138, a OR gate 139, a clock generating device 141, a zero point detecting device 142, an error amplifying device 144, an over current protection device 146, and an over voltage protection device 148. The function device 135 is started after receiving the initial signal INI. The clock generating device 141 outputs a clock signal OSC to the processing device 138. The driving over voltage protection device 132 receives the voltage division signal VDD' generated by the first resistor R1 and the second resistor R2 in the start unit 110 and a driving over voltage reference signal Vvdd. When the driving voltage VDD is greater than a predetermined driving over voltage value, i.e. the voltage division signal VDD' is higher than the driving over voltage reference signal Vvdd, the driving over voltage protection device 132 outputs a driving over voltage protection signal OVP' having the high voltage level. The over temperature protection 136 detects the temperature of the controller 100a. When the temperature is higher than a predetermined temperature, the over temperature protection 136 outputs an over temperature protection signal OTP with high voltage level. The zero point detecting device 142 detects the current flowing through the second switch SW2. When the voltage level of a detecting signal is lower than the voltage level of a zero point reference voltage signal Vz, the zero point detecting device 142 outputs a zero point detecting signal ZD with high voltage level, wherein the detecting signal represents the amount of current flowing through the second switch SW2. The error amplifying device 144 receives the current feedback signal IFB and a current reference signal Vr and outputs an error amplifying signal EA according thereto. The over current protection device 146 receives the current feedback signal IFB and an over current reference signal Vri and outputs an over current protection signal OCP with high voltage level when the voltage level of the current feedback signal IFB is higher than the voltage level of the over current reference signal Vri. The over voltage protection device 148 receives the voltage feedback signal VFB and an over voltage reference signal Vrv and outputs an over voltage protection signal OVP with high voltage level when the voltage level of the voltage feedback signal VFB is higher than the voltage level of the over voltage reference signal Vrv. When the over temperature protection signal OTP, the over current protection signal OCP, driving over voltage protection signal OVP', and the over voltage protection signal OVP all are at the low voltage level, but the initial signal INI is at the high voltage level, the function device 135 operates normally. Accordingly, the processing device 138 determines a duty cycle of the first control signal S1 according to the error amplifying signal EA and the clock signal OSC and a duty cycle of the second control signal S2 according to the zero point detecting signal ZD, so that the current flowing through the LED module 180 steadily stays around a predetermined current value. When any of the over temperature protection signal OTP, the over current protection signal OCP, driving over voltage protection signal OVP', and the over voltage protection signal OVP is at the high voltage level, or the initial signal INI is at the low voltage level, the controller 100a enters the protection mode. Accordingly, the processing device 138 outputs a protecting signal PROT to the latch unit 120, and the latch unit 120 outputs the latch signal LATCH with high voltage level, so that the voltage stabilizer 130 stops outputting the operating voltage VCC to stop the control unit 140 from operating.

Moreover, the electric power required by the start unit 110 and the latch unit 120 for operating is lower than or equal to the electric power supplied by the input voltage Vin through the starting resistor Rin. Accordingly, when the control unit 140 enters the protection mode and stops operating due to the abnormal event occurring in the circuit, the output voltage Vout falls down and can not supply the electric power to the controller 100a, but the input voltage Vin can still supply sufficient electric power to the controller 100a, so that the driving voltage VDD does not fall down continuously or is even raised. As a result, it is ensured that the driving voltage VDD is maintained to be higher than the lowest operating voltage of the latch unit 20 when the controller 100a enters the protection mode, so that the latch unit 20 still latches the controller 100a to avoid the issue of continuously re-starting the circuit.

Figure 5A:
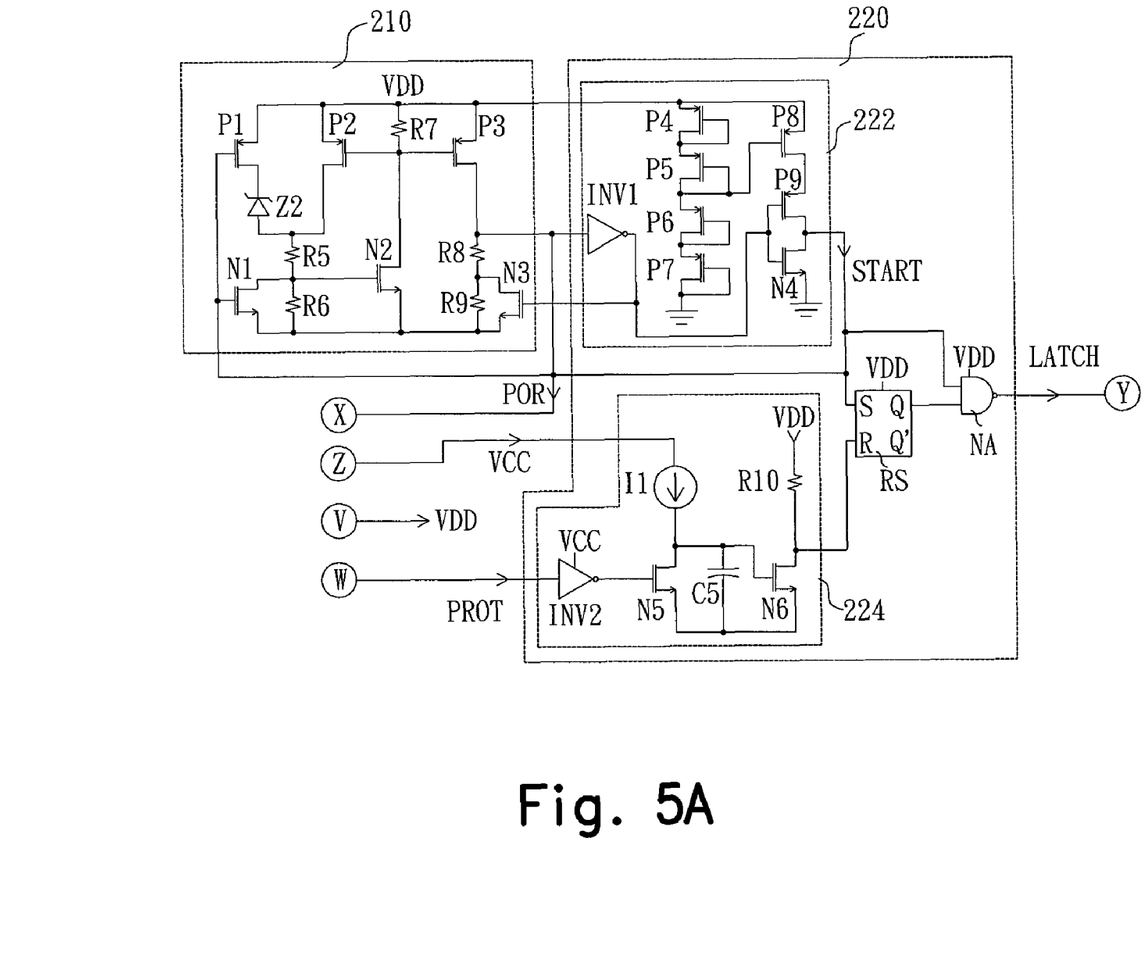
FIG. 5A and FIG. 5B are schematic circuits of a power converting circuit according to a second embodiment consistent with the present invention.
Figure 5B:
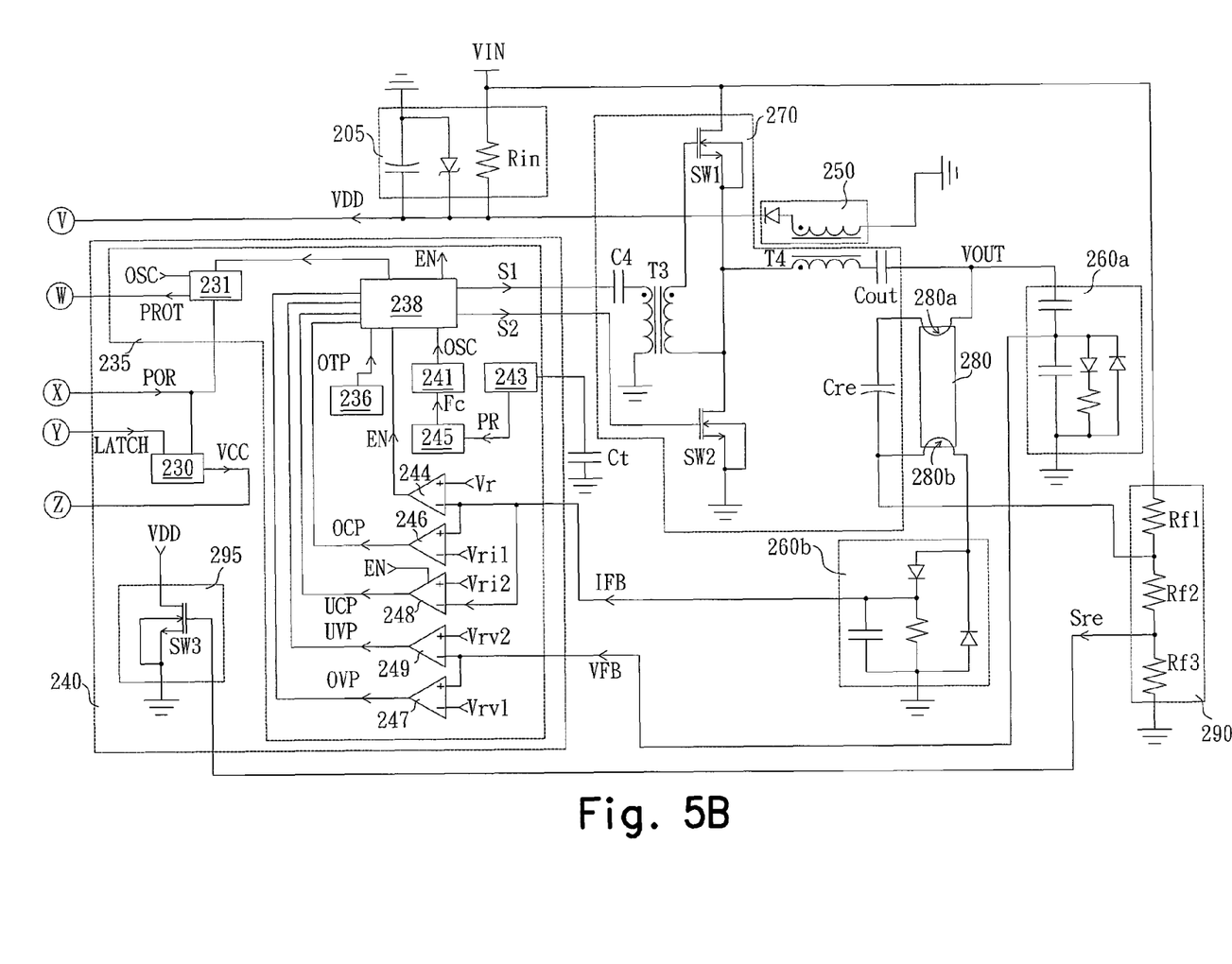

FIG. 5A and FIG. 5B are schematic circuits of power converting circuits according to a second embodiment consistent with the present invention. Referring to FIG. 5A and FIG. 5B, the power converting circuit includes a controller, a start circuit 205, a voltage converting device 250, a feedback circuit, a converting circuit 270, wherein the feedback circuit includes a first feedback unit 260a and a second feedback unit 260b. The power converting circuit converts an input voltage Vin to an output voltage Vout to drive a lamp 280. The start circuit 205 includes a capacitor and a Zener diode coupled in parallel and a starting resistor Rin coupled to the input voltage Vin. One terminal of the start circuit 205 is grounded, and another one of the start circuit 205 is coupled to the input voltage Vin through the starting resistor Rin. After the input voltage Vin is inputted to the power converting circuit, the capacitor inside the start circuit 205 starts to store electric power and generates a driving voltage VDD to the controller, so as to supply the voltage and the electric power required by the controller while starting. The voltage converting device 250 includes a rectifying diode and a secondary side of a transformer T4 and is coupled to the output voltage Vout, the controller, and the start circuit 205, so that the output voltage Vout is converted to a suitable voltage through the transformer T4 and supplied to the controller as a driving electric power after being rectified by the rectifying diode. The first feedback unit 260a in the feedback circuit is coupled to the output voltage Vout to generate a voltage feedback signal VFB representing the amount of the output voltage Vout, and the second feedback unit 260b is coupled to the lamp 280 to generate a current feedback signal IFB representing the amount of the current flowing through the lamp 280. The controller includes a start unit 210, a latch unit 220, and a control unit 240 and generates the first control signal S1 and the second control signal S2 according to the current feedback signal IFB and the voltage feedback signal VFB. The converting circuit 270 includes a first switch SW1, a second switch SW2, a driving capacitor C4, a driving transformer T3, an output capacitor Cout, a resonant capacitor Cre, and a primary side of the transformer T4. The converting circuit 270 is configured to convert a DC input voltage Vin to an AC output voltage Vout to drive the lamp 280, such as a fluorescent lamp and a cold cathode fluorescent lamp (CCFL), according to the first control signal S1 and the second control signal S2.

Referring to FIG. 5A, the start unit 210 includes a first p-type transistor switch P1, a second p-type transistor switch P2, a third p-type transistor switch P3, a first n-type transistor switch N1, a second n-type transistor switch N2, a third n-type transistor switch N3, a fifth resistor R5, a sixth resistor R6, a seventh resistor R7, an eighth resistor R8, a ninth resistor R9, and a Zener diode Z2. After the driving voltage VDD is raised from zero to be higher than the breakdown voltage of the Zener diode Z2, a current flows from the driving voltage VDD to the ground through the first p-type transistor switch P1, the Zener diode Z2, the fifth resistor R5, and the sixth resistor R6. Next, the driving voltage VDD is still raised, and a voltage of a connection point of the fifth resistor R5 and the sixth resistor R6 is also raised along therewith. When the voltage of the connection point of the fifth resistor R5 and the sixth resistor R6 is raised to be higher than the threshold voltage of the second n-type transistor switch N2, the second n-type transistor switch N2 is turned on, so that a current also flows from the driving voltage VDD to the ground through the seventh resistor R7 and the second n-type transistor switch N2. Thereafter, the driving voltage VDD is still raised, and the voltage of the connection point of the fifth resistor R5 and the sixth resistor R6, i.e. a voltage of a gate of the second n-type transistor switch N2, is also raised along therewith, so that the current flowing through the seventh resistor R7 and the second n-type transistor switch N2 is increased. When the current flowing through the seventh resistor R7 is large enough, a voltage of a connection point of the seventh resistor R7 and the second n-type transistor switch N2 falls down to be lower than the threshold voltages of the second p-type transistor switch P2 and the third p-type transistor switch P3. Meanwhile, the second p-type transistor switch P2 and the third p-type transistor switch P3 are turned on, so that a connection point of the third p-type transistor switch P3 and the eighth resistor R8 generates a high-level starting signal POR. When the start unit 210 generates the starting signal POR, the driving voltage VDD is equal to the first predetermined voltage UVLO.

The latch unit 220 includes a self-holding circuit 222, a latch protecting circuit 224, a RS latch RS, and a NAND gate NA, wherein the self-holding circuit 222, the latch protecting circuit 224, and the RS latch RS are all coupled to the driving voltage VDD to receive the electric power required for operating, and the latch protecting circuit 224 is also coupled to the operating voltage VCC to receive the electric power required for operating. The self-holding circuit 222 includes a first inverter INV1, a fourth p-type transistor switch P4, a fifth p-type transistor switch P5, a sixth p-type transistor switch P6, a seventh p-type transistor switch P7, an eighth p-type transistor switch P8, a ninth p-type transistor switch P9, and a fourth n-type transistor switch N4. When the driving voltage VDD is raised from zero, firstly the driving voltage VDD is within the range of double threshold voltage of the p-type transistor switch to the first predetermined voltage UVLO to have turning on the eighth p-type transistor switch P8 through the fourth p-type transistor switch P4, the fifth p-type transistor switch P5, the sixth p-type transistor switch P6, and the seventh p-type transistor switch P7,. Next, when the driving voltage VDD is higher than the first predetermined voltage UVLO, the first inverter INV1 of the self-holding circuit 222 receives the high-level starting signal POR and inverts the starting signal POR to be a low-level output signal, the ninth p-type transistor switch P9 is turned on and the fourth n-type transistor switch N4 is turned off, so that the self-holding circuit 222 outputs a self-holding driving signal START with high voltage level. Moreover, the low-voltage level output signal from the first inverter INV1 turns off the third n-type transistor switch N3 in the start unit 210, so that the current flowing through the third p-type transistor switch P3 further flows through the ninth resistor R9. As a result, the voltage level of the connection point of the third p-type transistor switch P3 and the eighth resistor R8 is raised to ensure that the starting signal POR is at high voltage level against noise interference. The self-holding driving signal START with high voltage level turns on the first n-type transistor switch N1 and turns off the first p-type transistor switch P1. Since the first n-type transistor switch N1 is turned on, the voltage level of the connection point of the fifth resistor R5 and the sixth resistor R6 falls down to zero, so that the second n-type transistor switch N2 is turned off. After the second n-type transistor switch N2 is turned off, a voltage level of a connection point of the second n-type transistor switch N2 and the seventh resistor R7 is raised up to the driving voltage VDD, so that the second p-type transistor switch P2 and the third p-type transistor switch P3 are turned off again. Accordingly, when the first p-type transistor switch P1, the second p-type transistor switch P2, and the third p-type transistor switch P3 are all turned off, the start unit 210 stops operating. Hence, since the start unit 210 stops operating after outputting the starting signal POR, the power consumption of the controller is saved after the controller started. However, the start unit 210 stops operating, but the eighth p-type transistor switch P8 and the ninth p-type transistor switch P9 are still turned on and are grounded through the eighth resistor R8 and the ninth resistor R9. As a result, the latch unit 220 still outputs the self-holding driving signal START with high voltage level to maintain itself to operate except the driving voltage VDD falls down to be lower than the double threshold voltage of the p-type transistor switch.

Referring to FIG. 5A, the latch protecting circuit 224 includes a second inverter INV2, a fifth n-type transistor switch N5, a sixth n-type transistor switch N6, a charging capacitor C5, a current source I1, and a tenth resistor R10, wherein the current source I1 is coupled to the operating voltage VCC, and the tenth resistor R10 is coupled to the driving voltage VDD. When the power converting circuit is started at the beginning, the RS latch RS is coupled to the driving voltage VDD through the tenth resistor R10, so that the input terminal R thereof receives a high-level signal, and the output terminal Q thereof outputs a high-level signal. When the voltage level of the self-holding driving signal START is changed to be at high voltage level and inputted to the input terminal S of the RS latch RS, the output terminal Q thereof is thus maintained to output high-level signal. When the controller normally operates, a protecting signal PROT is at the low voltage level, and the fifth n-type transistor switch N5 is turned on due to the protecting signal PROT is inverted by the second inverter INV2. Meanwhile, the charging capacitor C5 stays at a discharge state, and the sixth n-type transistor switch N6 is turned off, so that a high-level signal is still outputted to the input terminal R of the RS latch RS. As a result, the output terminal Q thereof is still maintained at the high voltage level to input to the NAND gate NA. Meanwhile, the NAND gate NA receives the self-holding driving signal START with high voltage level and the high-level signal outputted from the output terminal Q of the RS latch RS, so as to generate a latch signal LATCH having the low voltage level. Accordingly, when the controller normally operates, the NAND gate NA outputs the latch signal LATCH with low voltage level and maintains the control unit 240 to normally operate.

When the protecting signal PROT is at the high voltage level, it means that the abnormal event occurs in the circuit, and the fifth n-type transistor switch N5 is turned off, so that the charging capacitor C5 starts to be charged. If the abnormal event is not removed immediately, the voltage across the charging capacitor C5 is raised up to be higher than the threshold voltage of the sixth n-type transistor switch N6 after a delay time, so that the sixth n-type transistor switch N6 is turned on. Meanwhile, the latch protecting circuit 224 outputs a low-level signal to the input terminal R of the RS latch RS, and the input terminal S of the RS latch RS still receives the latch signal LATCH with high voltage level, so that the output terminal Q of the RS latch RS is changed to be at the low voltage level. Since one of input signals received by the NAND gate NA is at the low voltage level (i.e., the signal outputted by the output terminal Q of the RS latch RS), the latch signal LATCH is changed to be at the high voltage level to stop the control unit 240 operating. Meanwhile, the electric power is simply consumed in the current path formed by the eighth p-type transistor switch P8, the ninth p-type transistor switch P9, the eighth resistor R8, and the ninth resistor R9 inside the controller, but the other current paths inside the controller are cut off. Accordingly, it is ensured that when the controller enters the protection mode, the electric power required thereby is less than the electric power supplied by the start circuit 205, so that the driving voltage VDD is maintained to be higher than the lowest operating voltage of the latch unit 220. In the present embodiment, the lowest operating voltage of the latch unit 220 is the double threshold voltage of the p-type transistor switch.

Referring to FIG. 5B, the control unit 240 includes the voltage stabilizer 230 and the function device 235. The voltage stabilizer 230 receives the starting signal POR and the latch signal LATCH and is started to operate when the starting signal POR is at the high voltage level. When the latch signal LATCH is at the low voltage level, the voltage stabilizer 230 converts the driving voltage VDD to the operating voltage VCC. On the contrary, when the latch signal LATCH is at the high voltage level, the voltage stabilizer 230 stops operating.

The function device 235 includes an over temperature protection 236, a processing device 238, a clock generating device 241, a warm-up time device 243, an error amplifying device 244, a frequency sweep control device 245, an over current protection device 246, an over voltage protection device 247, a under current protection device 248, and a under voltage protection device 249.

After receiving the starting signal POR with high voltage level, the control unit 240 starts to operate. The clock generating device 241 generates a clock signal OSC having a relatively high frequency, so that the processing device 238 outputs the first control signal S1 and the second control signal S2 both with the relatively high frequency. As a result, a first filament 280a and a second filament 280b are warmed up. The warm-up time device 243 is coupled to a warm-up capacitor Ct and charges it when the controller operates. When the voltage level of the warm-up capacitor Ct is equal to a predetermined warm-up voltage level, the warm-up time device 243 outputs a frequency sweep signal PR, so that the frequency sweep control device 245 outputs a frequency sweep control signal Fc. As a result, the frequency of the clock signal OSC generated by the clock generating device 241 gradually falls down to ignite the lamp and is maintained at a predetermined operating frequency after falling down to be equal to the predetermined operating frequency.

The over temperature protection 236 detects the temperature of the controller. When the temperature is higher than a predetermined temperature, the over temperature protection 236 outputs an over temperature protection signal OTP. The error amplifying device 244 receives the current feedback signal IFB and a current reference signal Vr and outputs an error amplifying signal EA according thereto. The over current protection device 246 receives the current feedback signal IFB and an over current reference signal Vri1 and outputs an over current protection signal OCP when the voltage level of the current feedback signal IFB is higher than the voltage level of the over current reference signal Vri1. After receiving an enabling signal EN, the under current protection device 248 is started to receive the current feedback signal IFB and a under current reference signal Vri2. It is avoided erroneous judgment due to no current flowing through the lamp 280 before being ignited. Moreover, when the voltage level of the current feedback signal IFB is lower than the voltage level of the under current reference signal Vri2, the under current protection device 248 outputs a under current protection signal UCP. The over voltage protection device 247 receives the voltage feedback signal VFB and an over voltage reference signal Vrv1 and outputs an over voltage protection signal OVP when the voltage level of the voltage feedback signal VFB is higher than the voltage level of the over voltage reference signal Vrv1. The under voltage protection device 249 receives the voltage feedback signal VFB and a under voltage reference signal Vrv2 and outputs a under voltage protection signal UVP when the voltage level of the voltage feedback signal VFB is higher than the voltage level of the under voltage reference signal Vrv2.

When the frequency of the clock signal OSC falls down to the predetermined operating frequency, and the abnormal event does not occur in the circuit, the lamp 280 is ignited. Meanwhile, the processing device 238 generates the enabling signal EN to start the under current protection device 248, so that the under current protection device 248 detects whether the lamp 280 is ignited or not. The processing device 238 is configured to receive the under voltage protection signal UVP, the over voltage protection signal OVP, the under current protection signal UCP, the over current protection signal OCP, and the over temperature protection signal OTP. Accordingly, when receiving any of them, the processing device 238 stops outputting the first control signal S1 and the second control signal S2 for a predetermined re-starting time. Meanwhile, the driving voltage VDD falls down to be lower than the first predetermined voltage UVLO and is raised after the processing device 238 outputs the first control signal S1 and the second control signal S2 again. The processing device 238 includes a counter 231 to count the re-starting times. The counter 231 is coupled to the processing device 238, the start unit 210, and the latch unit 220 and counts the time of receiving the starting signal POR after receiving the protecting signal PROT. For example, if the processing device 238 re-starts the power supply for three times and the abnormal event can not be removed yet, the counter 231 thus transmits the protecting signal PROT to the latch unit 220. Alternatively, when the counter 231 does not receive the starting signal POR yet after receiving the protecting signal PROT for a predetermined re-starting confirming time, it means that the output voltage Vout can not be successfully raised again due to the abnormal event occurring in the converting circuit 270, so that the counter 231 also transmits the protecting signal PROT to the latch unit 220. Wherein, the predetermined re-starting confirming time is longer than the predetermined re-starting time.

Moreover, in order to make the power converting circuit to be automatically restarted after the users replace the lamp 280 with a new one, a load re-start circuit 290 is added and coupled to the lamp 280 to detect whether the lamp 280 is removed or not. Referring to FIG. 5B, the load re-start circuit 290 is coupled the second filament 280b of the lamp 280 and the DC input voltage VIN to detect whether the lamp 280 is there or not. After the lamp 280 is removed, the load re-start circuit 290 generates a re-starting signal Sre with high voltage level, so that the control unit 240 is re-started. The control unit 240 further includes a re-start unit 295 coupled to the driving voltage VDD. That is, the re-start unit 295 is coupled to the start circuit 205. The re-start unit 295 releases the energy stored in the capacitor in the start circuit 205 after receiving the re-starting signal Sre, so that the driving voltage VDD falls down to be lower than the lowest operating voltage of the latch unit 220. As a result, all of the circuits in the controller are reset. When the lamp 280 is assembled in the power converting circuit again, the load re-start circuit 290 stops outputting the re-starting signal Sre. Meanwhile, the re-start unit 295 stops releasing the energy stored in the capacitor in the start circuit 205, so that the driving voltage VDD starts to be raised. When the driving voltage VDD is raised up to the first predetermined voltage UVLO, the controller re-starts.

In the present embodiment, the load re-start circuit 290 includes a first re-starting resistor Rf1 and a second re-starting resistor Rf2 and a third re-starting resistor Rf3 connected in series. Furthermore, the re-start unit 295 includes a third switch SW3, such as a n-type transistor switch. One terminal of the first re-starting resistor Rf1 is coupled to the DC input voltage VIN, and the other terminal of the first re-starting resistor Rf1 is coupled to one terminal of the second re-starting resistor Rf2. Moreover, the first re-starting resistor Rf1 is grounded through the second filament 280b and the second feedback circuit 260b. The other terminal of the second re-starting resistor Rf2 is coupled to one terminal of the third re-starting resistor Rf3 to generate the re-starting signal Sre to the third switch SW3. Besides, the other terminal of the third re-starting resistor Rf3 is grounded. When the lamp 280 is there, a voltage level of a connection point of the first re-starting resistor Rf1 and the second re-starting resistor Rf2 is limited by the second filament 280b and the second feedback circuit 260b, and it is thus equal to or less higher than the forward bias of the diode in the second feedback circuit 260b. After being divided by the second re-starting resistor Rf2 and the third re-starting resistor Rf3, the voltage level of the re-starting signal Sre is at very low voltage level, so that the re-starting signal Sre can not turn on the switch SW3. When the lamp 280 is not there or removed, the voltage level of the connection point of the first re-starting resistor Rf1 and the second re-starting resistor Rf2 is pulled up by the DC input voltage VIN, so that the voltage level of the re-starting signal Sre is higher than the threshold voltage of the switch SW3. As a result, the switch SW3 is turned on, so that the driving voltage VDD falls down and is near to zero. Accordingly, the latch unit 220 can not latch the controller any more, so that the controller can automatically re-start after lamp replacement.

To sum up, the power converting circuit latches the controller thereof when the abnormal event occurs in the circuit or after the controller fails to re-start the circuit for finite times in the embodiment consistent with the present invention. Accordingly, the latched controller stops providing a part or all of the functions to lower the power consumption, so that the driving voltage is maintained to be higher than the lowest operating voltage of the latch unit. As a result, the issues, such as shortened life-span and safety of users, due to the converting circuit in the related arts are avoided in an embodiment of the present invention. The power converting circuit is automatically re-started after the lamp is replaced in an embodiment of the present invention. For the abnormal event due to the damaged lamp, after the users replace the lamp with a new one, the power converting circuit is automatically re-started. Therefore, the power converting circuit is more convenient for use.

As in the above description, the present invention completely complies with the patentability requirements: novelty, non-obviousness, and utility. It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A controller, receiving electric power required for operating through a driving voltage terminal and configured to control a converting circuit to convert an input voltage into an output voltage, the controller comprising:
a start unit coupled to the driving voltage terminal and generating a starting signal after a driving voltage of the driving voltage terminal is higher than a first predetermined voltage;
a control unit started to control the converting circuit after receiving the starting signal; and
a latch unit coupled to the driving voltage terminal, started after receiving the starting signal, and generating a latch signal once the controller enters a protection mode,
wherein a second predetermined voltage is a lowest operating voltage of the latch unit, and the second predetermined voltage is lower than the first predetermined voltage, and after receiving the latch signal, the control unit terminates at least a portion of operation thereof to reduce the electric power required for operating, so that the driving voltage is maintained to be higher than the second predetermined voltage.

2. The controller as claimed in claim 1, wherein the control unit controls the converting circuit according to at least one feedback signal.

3. The controller as claimed in claim 2, wherein the control unit determines whether to enter the protection mode according to the at least one feedback signal and the driving voltage, when the controller enters the protection mode, a protecting signal is generated, and the latch unit outputs the latch signal after receiving the protecting signal.

4. The controller as claimed in claim 3, further comprising a voltage stabilizer coupled to the driving voltage to generate an operating voltage to supply the electric power required by the control unit, and after receiving the latch signal, the voltage stabilizer stopping providing the operating voltage.

5. The controller as claimed in claim 4, wherein the start unit stops operating after outputting the starting signal.

6. The controller as claimed in claim 3, wherein the driving voltage terminal is coupled to the input voltage and the output voltage to receive the electric power required by the control unit.

7. The controller as claimed in claim 6, wherein the driving voltage terminal is coupled to the input voltage through a start circuit to supply the driving voltage.

8. The controller as claimed in claim 7, wherein the start circuit is further coupled to the output voltage.

9. The controller as claimed in claim 6, wherein the control unit further comprises a counter coupled to the start unit and the latch unit, counting a number of times of the starting signal during a period of receiving the protecting signal, and outputting the protecting signal to the latch unit after the number of the times of the starting signal achieves a predetermined times.

10. The controller as claimed in claim 3, further comprising a re-start unit coupled to the driving voltage terminal and grounding the driving voltage terminal after receiving a re-starting signal.

11. A power converting circuit, comprising:
a converting circuit configured to convert an input voltage to an output voltage to drive a load according to at least one control signal;
a start circuit coupled to the input voltage to generate a driving voltage; and
a controller coupled to the start circuit and the output voltage to receive electric power required for operating and determining whether to operate in a protection mode according to the driving voltage, wherein when the controller does not operate in the protection mode, the controller generates the at least one control signal, and when the controller operates in the protection mode, the controller stops outputting the at least one control signal and still operates in the protection mode.

12. The power converting circuit as claimed in claim 11, further comprising a feedback circuit coupled to the output voltage to generate at least one feedback signal, wherein the controller further determines whether to operate in the protection mode according to the at least one feedback signal.

13. The power converting circuit as claimed in claim 12, wherein the controller reduces the required electric power to maintain the driving voltage to be higher than a predetermined voltage after entering into the protection mode, and the predetermined voltage is higher than or equal to a lowest operating voltage of the controller.

14. The power converting circuit as claimed in claim 13, wherein the load is a light emitting diode (LED) or a fluorescent lamp.

15. The power converting circuit as claimed in claim 13, wherein the controller enters into the protection mode after an abnormal event occurs, and the abnormal event is that the output voltage is greater than a predetermined over voltage value, that the output voltage is less than a predetermined under voltage value, that the driving voltage is less than a predetermined under voltage value, that the driving voltage is greater than the predetermined driving over voltage value, that a current of the load is greater than a predetermined over current value, or that the current of the load is less than a predetermined under current value.

16. The power converting circuit as claimed in claim 13, wherein the controller enters into the protection mode after an abnormal event occurs and continues for a period, and the abnormal event is that the output voltage is greater than a predetermined over voltage value, that the output voltage is less than a predetermined under voltage value, that the driving voltage is less than a predetermined under voltage value, that the driving voltage is greater than the predetermined driving over voltage value, that a current of the load is greater than a predetermined over current value, or that the current of the load is less than a predetermined under current value.

17. The power converting circuit as claimed in claim 13, wherein the output voltage is an alternating voltage, and a rectifying element is coupled to the output voltage and the controller to supply the electric power.

18. The power converting circuit as claimed in claim 13, further comprising a load re-start circuit configured to generate a re-starting signal according to that whether the load exits or not.

19. The power converting circuit as claimed in claim 18, wherein the controller lowers the driving voltage to be lower than the lowest operating voltage when receiving the re-starting signal.

20. A DC/AC power converting circuit, comprising:
a converting circuit configured to convert a direct current (DC) input voltage to an alternating current (AC) output voltage to drive a load according to at least one control signal;

a start circuit coupled to the DC input voltage to generate a driving voltage;

a voltage converting device coupled to the AC output voltage and configured to rectify the AC output voltage to a rectified voltage; and a controller coupled to the start circuit and the voltage converting device to receive electric power required for operating and determining whether to operate in a protection mode according to the driving voltage, wherein when the controller does not operate in the protection mode, the controller generates the at least one control signal, and when the controller operates in the protection mode, the controller stops outputting the at least one control signal and still operates in the protection mode.

21. The DC/AC power converting circuit as claimed in claim 20, wherein the load is a fluorescent lamp having a filament.

22. The DC/AC power converting circuit as claimed in claim 21, wherein the controller terminates at least a portion of operation thereof to reduce the electric power required for operating after entering the protection mode, so that the driving voltage is maintained to be higher than a predetermined voltage.

23. The DC/AC power converting circuit as claimed in claim 22, wherein the controller comprises a latch unit latching the at least a portion of operation of the controller in the protection mode, and the predetermined voltage is a lowest operating voltage of the latch unit.

24. The DC/AC power converting circuit as claimed in claim 22, further comprising a load re-start circuit coupled to the filament of the fluorescent lamp and generating a re-starting signal when the fluorescent lamp is removed.

25. The DC/AC power converting circuit as claimed in claim 24, wherein the controller lowers the driving voltage to be lower than the predetermined voltage when receiving the re-starting signal.

* * * * *